US005606613A

United States Patent [19]

Lee et al.

[11] Patent Number: 5,606,613

[45] Date of Patent: Feb. 25, 1997

[54] METHOD FOR IDENTIFYING A METERING ACCOUNTING VAULT TO DIGITAL PRINTER

[75] Inventors: Young W. Lee, Orange; Sungwon Moh, Wilton; Arno Muller, Westport, all of Conn.

[73] Assignee: Pitney Bowes Inc., Stamford, Conn.

[21] Appl. No.: 361,409

[22] Filed: Dec. 22, 1994

[51] Int. Cl.$^6$ .................... H04L 9/00

[52] U.S. Cl. .................... 380/21; 380/25; 380/51

[58] Field of Search .................... 380/55, 51, 21, 380/25

[56] References Cited

U.S. PATENT DOCUMENTS

| | | | |
|---|---|---|---|
| 4,605,820 | 8/1986 | Campbell, Jr. | 380/24 |
| 4,853,962 | 8/1989 | Brockman | 380/21 |
| 4,864,618 | 9/1989 | Wright et al. | 380/51 |
| 4,876,716 | 10/1989 | Okamoto | 380/21 |
| 5,121,432 | 6/1992 | Gilham et al. | 380/51 |
| 5,201,000 | 4/1993 | Matyas et al. | 380/30 |
| 5,233,657 | 8/1993 | Gunther | 380/23 |
| 5,293,465 | 3/1994 | Abumehdi et al. | 395/113 |
| 5,390,251 | 2/1995 | Pastor et al. | 380/21 |
| 5,455,862 | 11/1995 | Hoskinson | 380/21 |
| 5,481,612 | 1/1996 | Campana et al. | 380/25 |

*Primary Examiner*—Thomas H. Tarcza
*Assistant Examiner*—Pinchus M. Laufer
*Attorney, Agent, or Firm*—Lawrence E. Sklar; Melvin J. Scolnick

[57] ABSTRACT

The method for preventing monitoring of postage indicia data which is sent from a postage metering vault to a remotely located digital printer over a communication link between the meter vault and the digital printer. The meter is provided with an encryption engine for encrypting postage indicia data utilizing a encryption key. The digital printer includes a decryption engine for decrypting postage data received from said meter utilizing the same encryption key and then prints a postage indicia pursuant to the decrypted postage indicia data. The postage meter also includes a key manager for generating new encryption key pursuant to a token which is either randomly generated or generated pursuant to an algorithm by a similar encryption key manager located in the digital printer which token is also used to generate the decryption key for the decryption engine. As a result, the encryption keys are the same. Upon power-up of the system or at such other preselected times, the print controller module of the digital printer sends out an encrypted message to the meter. The message consist of a random number. The encryption/decryption engine of the vault decrypts the message. The vault then returns an encrypted new message to the print controller which includes an encoded representation of the relationship of the two messages. Upon receiving the new message from the vault, the print controller decrypts the new message and verifies the relationship. The print controller is then enabled to print a postage indicia.

2 Claims, 2 Drawing Sheets

METHOD FOR IDENTIFYING A METERING ACCOUNTING VAULT TO DIGITAL PRINTER

BACKGROUND OF THE INVENTION

The present invention relates to a postage metering system using digital printing and, more particularly, to a postage metering system wherein the postage accounting system is remotely located from the postage printer.

A conventional postage meter is comprised of a secure account system, also known as a vault, and an impact printing mechanism housed in a secure housing having tamper detection. The vault is physically secured and operationally interlocked to the printing mechanism. For example, it is now known to use postage meters employing digital printing techniques. In such systems, the vault and digital printer remain secure within the secure housing and printing can only occur after postage has been accounted for.

It is also known to employ a postage meter in combination with an inserting system for the processing of a mail stream. It has been determined that it would be beneficial to configure a postage metering system which employs an inserter and digital printer in combination with a remotely located vault. However, it has also been determined, as a security step, to be beneficial to provide a means to assure that an authorized vault is driving the digital printers in order to insure proper postal accounting between the system user and postal services. Further, such systems may be equipped with remote, funds resetting capability; therefore, it is necessary that the accounting records of the user, postal service and operator of the remote funds reset center be reconcilable with regard to an identifiable combination of vault and digital printing systems.

SUMMARY OF THE INVENTION

It is an object of the present invention to present a method of preventing the operation of a digital printer to print a postage indicia unless the digital printer is in electronic communication with a specific vault system.

A new metering system includes a meter in bus communication with a digital printer for enabling the meter to be located remote from the digital printer. The meter includes a vault which is comprised of a micro controller in bus communication with an application specific integrated circuit (ASIC) and a plurality of memory units secured in a tamper resistant housing. The ASIC includes a plurality of control modules, some of which are an accounting memory security module, a printer controller module and an encryption module. The digital printer includes a decoder/encoder ASIC sealed to the print head of the digital printer. The decoder/encoder ASIC communicates to the printer controller module via a printer bus. Communication between the printer controller and the print head decoder/encoder ASIC interface is accomplished through a printer bus which communications are encrypted by any suitable known technique, for example, using a data encryption standard (DES) algorithm. By encrypting the output of the printer controller module along the printer bus any unauthorized probing of the output of the printer controller to acquire and store the signals used to produce a valid postage print are prevented. If the electrical signals are probed, the data cannot easily be reconstructed into an indicia image by virtue of the encryption. The print head decoder consists of a custom integrated circuit located in proximity to the printing elements. It receives the output from the printer controller, decrypts the data, and reformats the data as necessary for application to the printing elements.

The printer controller and print head controller contain encryption key manager functional units. The encryption key manager is used to periodically change the encryption key used to send print data to the print head. The actual keys are not sent over the interface, rather, a token representing a specific key is passed. The key can be updated every time the printer controller clears the print head decoder, after a particular number of print cycles, or after a particular number of state machine clock cycles. By increasing the number of encryption keys, the probability that the system will be compromised diminishes.

In order to assure full and accurate accounting for the particular digital printer, upon power-up of the system or at such other preselected condition, the print controller module of the digital printer sends out an encrypted message to the meter. This message consists of an encrypted random number. The encryption/decryption engine of the postage meter decrypts the message. The meter then returns an encrypted new message to the print controller which includes an encoded representation of the relationship of the two messages. Upon receiving the new message from the vault, the print controller decrypts the new message and verifies the relationship. The print controller is then enabled to print a postage indicia.

DETAILED DESCRIPTION OF THE PREFERRED EMBODIMENT

Figure 1:
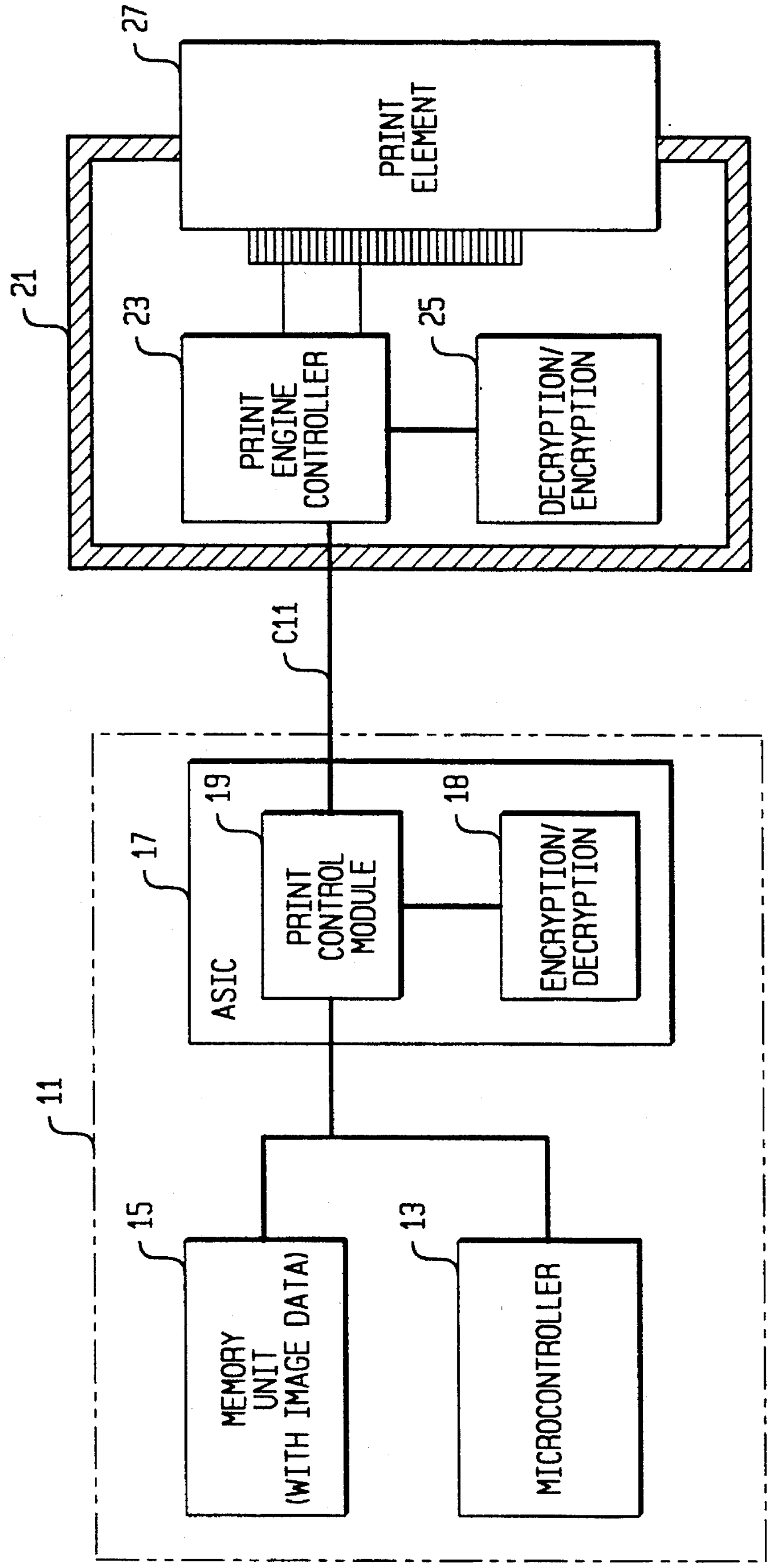
FIG. 1 is a diagrammatic representation of a postage meter in combination with a remote printing mechanism in accordance with the present invention.

Referring to FIG. 1, the postage meter control system 11 is comprised of a micro controller 13 in bus communication with a memory unit 15 and ASIC 17. The printing mechanism 21 is generally comprised of a print controller 23 which controls the operation of a plurality of print elements 27. Data is communicated between the meter control system 11 and the print mechanism over a bus C11. Generally, print data is first encrypted by an encryption module 18 and presented to the printer controller 23 through a printer controller module 19 of the ASIC 17. The data received by the print controller 23 is decrypted by a decryption module 25 in the print mechanism 21 after which the print controller 23 drives the print elements 27 in accordance with the received data. The data exchanged between the two devices is subject to interception and possible tampering since the electrical interconnects are not physically secured. Utilizing encryption to electrically secure the interface between the printer controller and print head reduces the ability of an external intrusion of data to the print mechanism 21 to drive unaccounted for posting by the printing mechanism 21. If the electrical signals are probed, the data cannot easily be reconstructed into an indicia image by virtue of the encryption. The print head mechanism 21 consists of a custom integrated circuit ASIC, more particularly described subsequently, located in proximity to the printing elements to allow physical security, such as by epoxy sealing, of the ASIC to the print head substrate utilizing any suitable known process.

Figure 2:
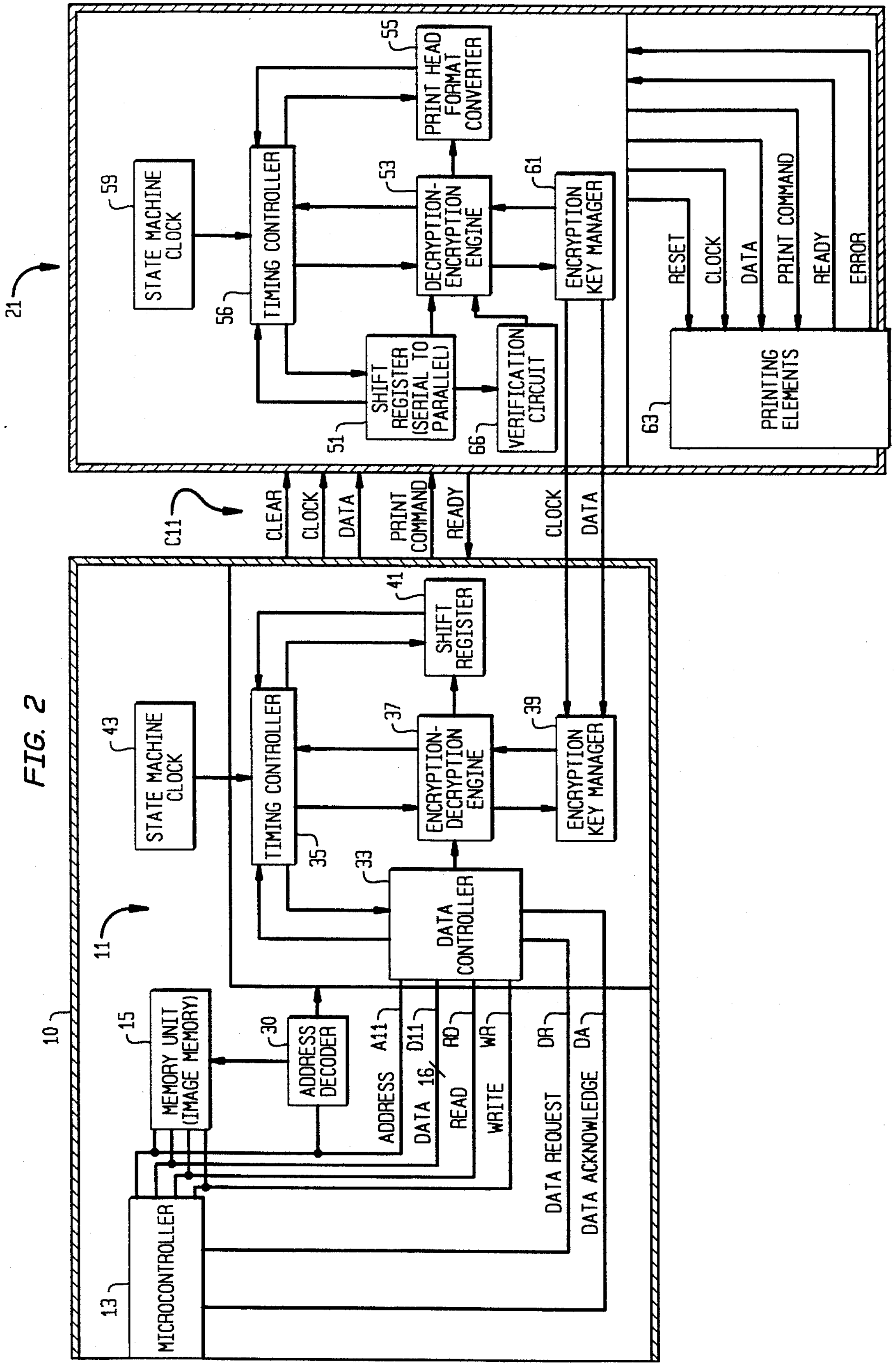
FIG. 2 is a diagrammatic representation of the postage meter micro control and printer micro control systems in accordance with the present invention.

Referring to FIG. 2, the meter control system 11 is secured within a secure housing 10. More specifically, the micro controller 13 electrically communicates with an address bus A11, a data bus D11, a read control line RD, a write control line WR, a data request control line DR and a data acknowledge control line DA. The memory unit 15 is also in electrical communication with the buses A11 and D11, and control lines RD and WR. An address decoder module 30 electrically communicates with the address bus A11. The output from the address decoder 30 is directed to a data controller 33, timing controller 35, encryption/decryption engine 37, encryption key manager 39 and shift register 41. The output of the address controller 30 operates in a conventional manner to enable and disable the data controller 33, timing controller 35, encryption engine 37, encryption key manager 39 and shift register 41 in response to a respective address generated by the micro controller 13.

The data controller 33 electrically communicates with the address bus and data bus A11 and D11, respectively, and also with the read and write control lines RD and WR, respectively. In addition, the data controller 33 electrically communicates with the data request DR and data acknowledge DA control lines. The output from the data controller 33 is directed to an encryption/decryption engine 37 where the output data from the data controller 33 is encrypted using any one of several known encryption techniques, for example, the DES encryption algorithm. The output from the encryption engine 37 is directed to the shift register 41. The timing controller 35 electrically communicates with the data controller 33, the encryption/decryption engine 37 and shift register 41 for providing synchronized timing signals to the data controller 33, the encryption/decryption engine 37 and shift register 41. The timing controller 35 receives an input clock signal from a state machine clock 43. In the most preferred configuration, an encryption key manager 39 is in electrical communication with the encryption/decryption engine 37 for the purpose of providing added system security in a manner subsequently described.

The printer mechanism 21 control ASIC includes a shift register 51, decryption/encryption engine 53 and a print head format converter 55. The output from the shift register 51 is directed to the input of the decryption/encryption engine 53. The output of the decryption/encryption engine 53 is directed to the print head format converter 55. The timing controller 56 electrically communicates with the shift register 51, the decryption/encryption engine 53, and the print head format converter 55 for providing synchronized timing signals to the data controller 33, the encryption/decryption engine 37 and shift register 41. The timing controller 56 receives an input clock signal from a state machine clock 59. In the most preferred configuration, a encryption key manager 61 is in electrical communication with the encryption/decryption engine 53 for the purpose of providing added system security and communicating with the encryption key manager 39 of the meter control system 11. The printer control ASIC electronically communicates with the print elements 63. Also provided is a verification circuit 66 which receives data from the shift register 41 only during system power-up and outputs data to the decryption/encryption engine 53.

In operation, upon power-up of the system or at such other selected times, the verification circuit in response to a power-up print command (Print Cmmd) from the meter 10 outputs a random number message to the decryption/encryption engine 37 which encrypts the message in response to the power-up print command. The encrypted message is sent out to the meter. The encryption/decryption engine 37 of the vault decrypts the message in response to the print command. The micro controller then returns an encrypted new message to the print controller which includes the encoded representation of the relationship of the two messages. Upon receiving the new message from the vault, the print controller decrypts the new message and verifies the relationship in response to a new print command. The print controller is then enabled to print a postage indicia. The print controller is now enabled resulting in the engine 37 being set in an encryption mode and engine 53 being set in a decryption mode.

Upon initiation of a print cycle, the micro controller 13 generates the appropriate address and generates an active write signal. The less significant bits (LBS) of the generated address is directed to the address decoder 30 and the most significant bits (MBS) are directed to the data controller 33. In response, the address decoder 30 generates the enabling signals for the data controller 33, timing controller 35, encryption engine 37 and shift register 41. The data controller 33 then generates a data request which then is received by the micro controller 13. The micro controller 13 then generates a read enable signal which enables the micro controller 13 to read the image data from the memory unit 15 and place the appropriate data on the data bus D11. That data is read by the data controller 33 which reformats the 32-bit data messages into 64-bit data messages and passes the 64-bit data messages to the encryption engine 37. The encryption engine 37 then encrypts the data using any suitable encryption algorithm and the encryption key supplied by the encryption key manager 39. The encrypted data is then passed to the shift register 41 for serial communication of the encrypted data to the printer 21. The operation of the data controller 33, encryption engine 37 and shift register 41 is synchronized by the timing controller 35 which receives a clocking signal from the state machine clock 43.

Over a communication bus C11, the encrypted serial data output from the shift register 41 is directed to the shift register 51 of the printer 21. Also carried over the bus C11 are the appropriate clock signals for clocking the data into the shift register 51 and a print command (Print Cmmd). When the whole of the information has been transmitted, a clear signal is generated over the bus C11. The shift registers 51 of the printer 21 reformat the encrypted data back into 64-bit parallel form and transfers the 64-bit data messages to the decryption engine 53 which decrypts the data using the same key used to encrypt the data which is provided by the encryption key manager 61. The decrypted data is then received by the print format converter 55 for delivery to the print head driver which enables the appropriate printing elements. It should now be appreciated that the process described is particularly suitable for any form of digital printer, such as, ink jet or thermal. Once the printing process has been completed a ready signal is sent to the meter over the bus C11.

The function of the encryption key manager in both printer controller and print head controller is to periodically change the encryption key used to send print data to the print head. The actual keys are not sent over the interface, rather, a token representing a specific key is passed. This token may be the product of an algorithm which represents any desired compilation of the data passed between the meter and the printer over some predetermined period. The token is then sent to the encryption key manager 39 which generates an identical key based on the token. For example, the key can be updated every time the printer controller clears the print head decoder, after a particular number of print cycles, or after a particular number of state machine clock cycles. By increasing the number of encryption keys, the probability that the system will be compromised diminishes. Preferably, the selection of the encryption key is a function of the print head decoder. This is done because if one key is discovered, the print head decoder could still be made to print by instructing the decoder to use only the known (compromised) key. The print head decoder can be made to randomly select a key and force the printer controller to comply. Once the data is decrypted, it is vulnerable to monitoring or tampering. By sealing the decoder to the print head and using any suitable known tamper protection techniques, the data can be protected. Such techniques include incorporating the decoder on the same silicon substrate as the printing elements control, utilizing chip-on-board and encapsulation techniques to make the signals inaccessible, constructing a hybrid circuit in which the decoder and printing elements controls are in the same package, utilizing the inner routing layers of a multi-layer circuit board to isolate the critical signals from unwanted monitoring, and fiber optic or opto-isolation means.

The provided description illustrates the preferred embodiment of the present invention and should not be viewed as limiting. The full scope of the invention is defined by the appended claims.

What is claimed is:

1. A method for verifying a specific, operable combination of a postage metering controller and a remotely located digital printer over a communication link between the controller and the printer, comprising the steps of:

providing said meter with means for encrypting/decrypting data utilizing an encryption key;

providing said printer with means for encrypting/decrypting postage data utilizing said encryption key;

generating a random number and encrypting said random number at said printer;

transmitting said encrypted random number to said controller;

decrypting said random number and re-encrypting said random number at said controller in such a way to have a known relationship to said original random number and encrypting said known relationship in the same manner as the re-encryption of the random number;

transmitting said re-encrypted random number and said encrypted known relationship to said printer;

decrypting said re-encrypted random number and said known relationship and verifying said known relationship at said printer;

providing said printer with means of generating a token and with an encryption key manager for generating said encryption key pursuant to said token, said token corresponding to a key generation method based on at least one totally random variable;

generating a token by means of said printer;

communicating said token to said controller;

providing said controller with an encryption key manager for generating an encryption key pursuant to said token;

generating said encryption key by said encryption key manager in said controller pursuant to said token such that said encryption key of both of said encryption key managers are identical; and enabling said printer upon verification.

2. A postage metering system having a postage meter remote from a digital printer used to print postage indicia, comprising:

said postage meter having a micro controller and encryption-decryption means for encrypting and decrypting data pursuant to an encryption key in response to command signals from said micro controller;

said digital printer having encryption-decryption means for encrypting and decrypting data pursuant to an encryption key in response to command signals from said micro controller;

communication means for communicating data between said postage meter and said digital printer;

said digital printer having means for generating a random number and causing said random number to be encrypted and causing said communication means to communicate said random number to said meter encryption-decryption means;

said micro controller having means for causing said meter encryption-decryption means to decrypt said random number and means for encoding said random number in a desired relationship and causing said meter encryption-decryption means to encrypt said encoded random number and said relationship and to cause said communication means to communicate said encoded random number and said relationship to said printer encryption-decryption means;

said digital printer having an encryption key manager means for generating a new encryption key, when desired, as a function of said random number and said relationship and for generating a token as a function of said random number and said relationship;

communication means for electronically communicating said token to said postage meter encryption key manager;

said postage meter having an encryption key manager means for generating an encryption key in response to said token; and said printer encryption-decryption means having verification means for verifying said decrypted encoded random number and said relationship and enabling said digital printer if verification is successful.

* * * * *